United States Patent
Maezawa et al.

(10) Patent No.: US 7,122,919 B2
(45) Date of Patent: Oct. 17, 2006

(54) FIXATION FRAMEWORK FOR RING-SHAPED PERMANENT MAGNET

(75) Inventors: Kazuo Maezawa, Niigata-ken (JP); Mamoru Saito, Niigata-ken (JP)

(73) Assignee: Twinbird Corporation, Nishikanbara-gun (JP)

( * ) Notice: Subject to any disclaimer, the term of this patent is extended or adjusted under 35 U.S.C. 154(b) by 163 days.

(21) Appl. No.: 10/786,899

(22) Filed: Feb. 24, 2004

(65) Prior Publication Data
US 2004/0189105 A1 Sep. 30, 2004

(30) Foreign Application Priority Data
Mar. 25, 2003 (JP) ............................. 2003-083858

(51) Int. Cl.
*H02K 1/34* (2006.01)
*H02K 33/02* (2006.01)
(52) U.S. Cl. ............................... 310/14; 310/12
(58) Field of Classification Search ............ 310/12–14
See application file for complete search history.

(56) References Cited
U.S. PATENT DOCUMENTS

| 5,111,510 | A | * | 5/1992 | Mitobe ....................... 381/398 |
| 5,321,762 | A | * | 6/1994 | Stuart .......................... 381/420 |
| 5,687,248 | A | * | 11/1997 | Yen et al. .................... 381/415 |
| 5,698,919 | A | * | 12/1997 | Obara ........................... 310/90 |
| 6,218,760 | B1 | * | 4/2001 | Sakuragi et al. ............ 310/254 |
| 6,682,045 | B1 | * | 1/2004 | Hashimoto ............. 251/129.11 |
| RE38,673 | E | * | 12/2004 | Elsasser et al. .......... 360/98.07 |

FOREIGN PATENT DOCUMENTS

| JP | 11-173695 | 7/1999 |
| JP | 2000-184641 | 6/2000 |
| JP | 2001 355513 A | 12/2001 |

* cited by examiner

*Primary Examiner*—Darren Schuberg
*Assistant Examiner*—David W. Scheuermann
(74) *Attorney, Agent, or Firm*—Akerman Senterfitt

(57) ABSTRACT

A ring-shaped permanent magnet comprising a Nd—Fe—B magnetic material is integrally insert-molded within a distal part of an inner periphery of a cylindrical supporting member. By employing this structure, a coaxial alignment accuracy of the permanent magnet relative to the supporting member depends on only an accuracy of a die for insert-molding. Accordingly, the coaxial alignment accuracy improves, Moreover, the ring-shaped permanent magnet comprising the Nd—Fe—B magnetic material expands in its radial direction when cooled down, while the supporting member comprising a resin contracts, thus the permanent magnet is firmly held by the supporting member. Indeed, a pore space is not created between a bonded surface of the supporting member and that of the permanent magnet. Therefore, the coaxial alignment accuracy will not go wrong.

2 Claims, 3 Drawing Sheets

FIXATION FRAMEWORK FOR RING-SHAPED PERMANENT MAGNET

BACKGROUND OF THE INVENTION

1. Field of the Invention

The present invention relates to a fixation framework for a ring-shaped permanent magnet which includes a permanent magnet integrated with a supporting member, and applied to a driving mechanism of a linear motor, etc.

2. Description of the Related Art

An example of a conventional Stirling cycle engine employing a fixation framework for a ring-shaped permanent magnet is disclosed in Japanese Patent Unexamined Publication No. 2001-355513. The disclosed Stirling cycle engine has a piston and a displacer sidably inserted into a cylinder provided within a casing, the piston being reciprocated by a driving mechanism. The driving mechanism for reciprocating the piston comprises: a ring-shaped permanent magnet fixed to one end of a short cylindrical-shaped supporting member, the supporting member being connected to a proximal end of the piston; a magnetism introducing member placed opposite around the inner periphery of the permanent magnet with a magnetic gap; and an electromagnetic coil wound around a core, the core being placed opposite around the outer periphery of the permanent magnet with a magnetic gap. When the piston is operated by the driving mechanism so that it travels in the cylinder and comes close to the displacer, a gas which is in a compression chamber provided between the piston and the displacer is compressed and flows into an expansion chamber provided between the distal end of the displacer and the distal portion of the casing, through a heat dissipating fin, a regenerator and a heat absorbing fin. Accordingly, the displacer is pushed downwardly with a predetermined phase difference relative to the piston. On the other hand, when the piston travels away from the displacer, the inside of the compression chamber is subjected to negative pressure, and the gas in the expansion chamber flows back to the compression chamber through the heat absorbing fin, the regenerator and the heat dissipating fin. Accordingly, the displacer is pressed upwardly with the predetermined phase difference relative to the piston. Throughout these processes, a reversible cycle consisting of two changes: an isothermal change; and an isovolumetric change is carried out, thus a part adjacent to the expansion chamber is brought into a low-temperature state and a part adjacent to the compression chamber is brought into a high-temperature state.

In the driving mechanism of this type included in the Stirling cycle engine generates an alternate magnetic field from the electromagnetic coil when an alternate current is applied thereto. The ring-shaped permanent magnet fixed to the supporting member is reciprocated in the axial direction of the cylinder by the generated alternate magnetic field, while the piston connected to the supporting member fixing the permanent magnet is reciprocated in the cylinder along the axial direction.

Conventionally, the permanent magnet used in such driving mechanism is secured to the cylindrical supporting member by an adhesive. More specifically, as shown in FIG. 3, the permanent magnet M is secured to the supporting member B by an adhesive according to a following method. That is, the permanent magnet M is set to a fixation jig A. An adhesive is then applied to the permanent magnet M, and the supporting member B is set to the fixation jig A so as to contact the permanent magnet M. In this method for fixing the permanent magnet M to the supporting member B while using the fixation jig A, however, a clearance between the outer periphery of the fixation jig A and the inner periphery of the supporting member B as well as that of the permanent magnet M is required in order to remove the supporting member B and the permanent magnet M from the fixation jig A. Moreover, a clearance between the supporting member B and the permanent magnet M as illustrated is required for filling the adhesion when the supporting member B is radially stacked onto the permanent magnet M in order to secure the permanent magnet M to the supporting member B by the adhesive. Because of the clearance of the supporting member B and the permanent magnet M relative to the fixation jig A, or the clearance of the supporting member B and the permanent magnet M, the permanent magnet M may be subjected to decentering relative to the piston connected to the supporting member B. Due to this, a coaxial alignment accuracy of the piston relative to the supporting member B tends to go wrong, thus there is a problem such that it is difficult to accurately keep a precision thereof. Further, in a case where the ring-shaped permanent magnet M expands and contracts in accordance with influences from conditions such as a temperature condition, it may easily break away from the supporting member B due to a thermal expansion coefficient difference thereof. Therefore, it is difficult to stabilize a quality of a product. Still further, applying an adhesive takes labor hours for controlling a hardening process or the like, thus an assembling workability is inferior.

SUMMARY OF THE INVENTION

The present invention has been made to solve the above problems. It is accordingly an object of the present invention to provide a fixation framework for a ring-shaped permanent magnet which can certainly fix a supporting member and a permanent magnet without an adhesive for attaching the permanent magnet while being able to coaxially support the permanent magnet to the supporting member precisely, thereby increasing output characteristics of a driving mechanism.

In order to attain the above objects, according to a first aspect of the present invention, there is provided a fixation framework for ring-shaped permanent magnet which comprises a ring-shaped permanent magnet and a supporting member for supporting the ring-shaped permanent magnet, wherein: the supporting member comprise a synthetic resin; and the permanent magnet is integrated with the supporting member by insert-molding.

By employing this structure, processes necessary for fixing such as an insertion of the permanent magnet, an adhesion or the like are not necessary, while a coaxial alignment accuracy of the permanent magnet relative to the supporting member depends only on a precision of a die for insert-molding.

The supporting member and the permanent magnet may have a spatial relationship in radial direction thereof such that said ring-shaped permanent magnet locates inside, and said supporting member locates outside.

According to this structure, the supporting member made from a synthetic resin contracts when cooled down after molding, but its contraction ratio is greater than that of the permanent magnet, thus it contacts the outer periphery of the permanent magnet with a pressure when those components are cooled down after molding in a case where the permanent magnet is placed inside and the supporting member is placed outside, each relative to radial direction.

The permanent magnet may comprise a Nd—Fe—B magnetic material, and be magnetized in radial direction thereof such that inside and outside thereof have different polarities.

According to this structure, the permanent magnet made from a Nd—Fe—B material has characteristics such that it has a positive thermal expansion coefficient along a direction parallel to a magnetic flux and a negative thermal expansion coefficient along a direction perpendicular to the magnetic flux. Thus the permanent magnet expands along the direction of its surface which is perpendicular to the direction of the magnetic flux and enlarges its outer diameter when cooled down. On the other hand, the supporting member made from a synthetic resin contracts when cooled down. Therefore, when both the permanent magnet and the supporting member are cooled down after molding, the supporting member contacts the outer surface of the permanent magnet with a pressure more strongly.

The permanent magnet made from a Nd—Fe—B magnetic material may have a positive thermal expansion coefficient along a direction of thickness thereof, the direction of thickness thereof being parallel to the direction of magnetizing, and a negative thermal expansion coefficient along a direction of surface thereof, the direction of surface thereof being perpendicular to the direction of magnetizing.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

Figure 1:
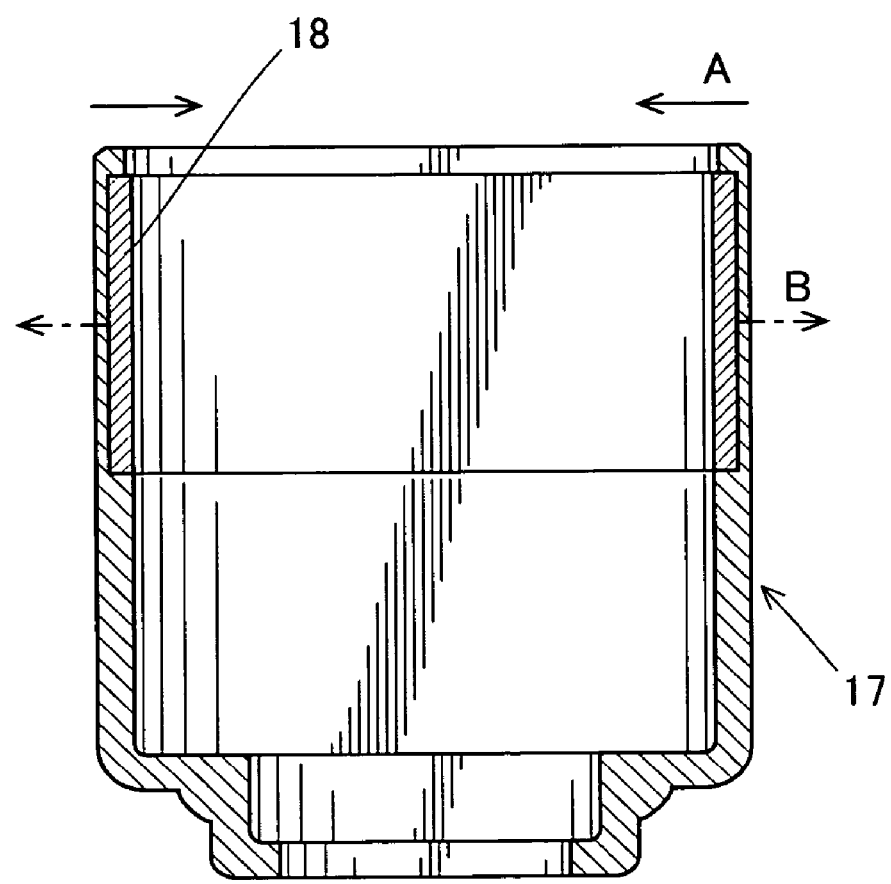
FIG. 1 is a cross sectional view showing a structure of a supporting member and a permanent magnet according to a preferred embodiment of the present invention.
Figure 2:
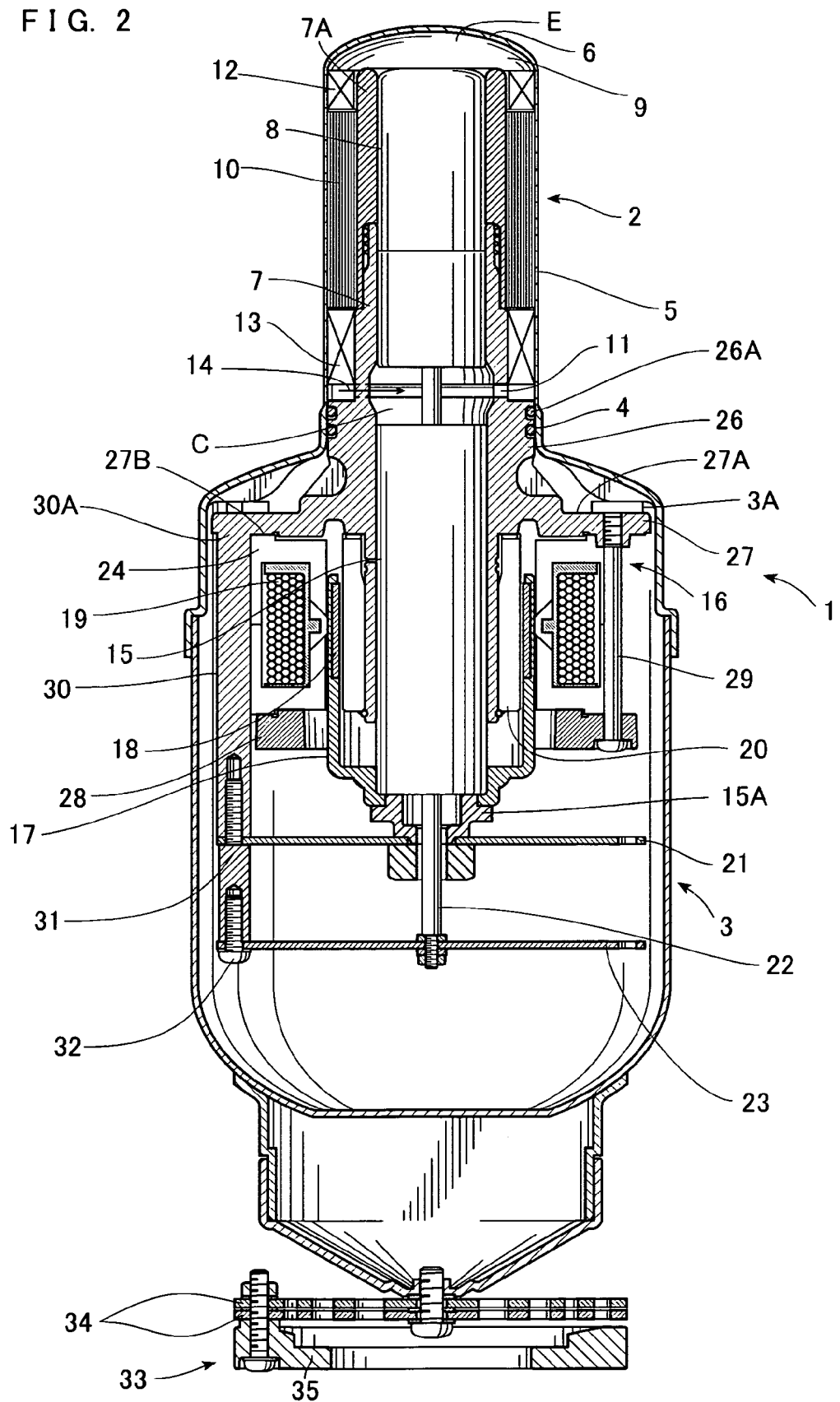
FIG. 2 is a cross sectional view showing a structure of a Stirling cycle engine including the supporting member and the permanent magnet according to the preferred embodiment of the present invention.
Figure 3:
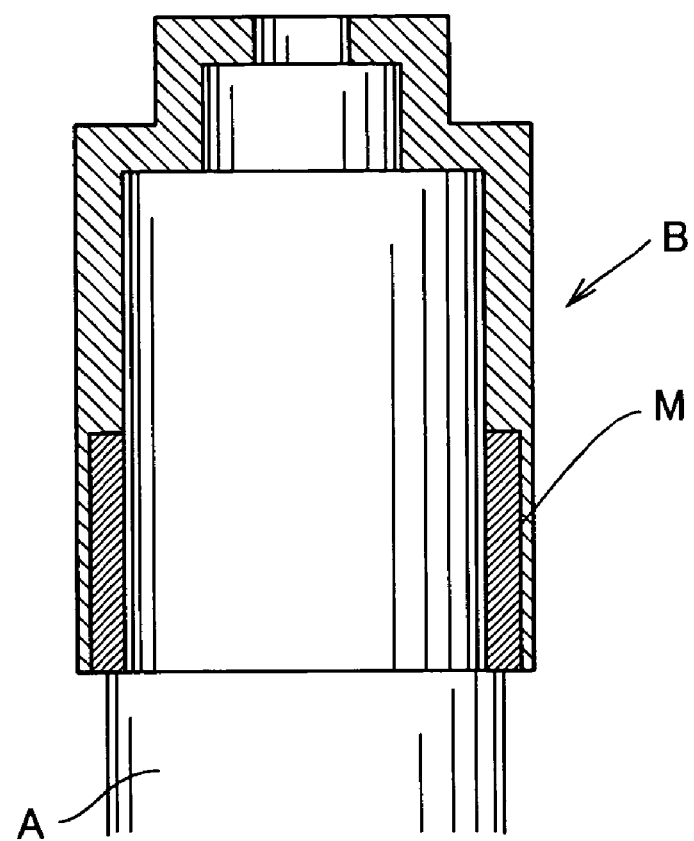
FIG. 3 is a cross sectional view showing the structure of a conventional example.

A preferred embodiment of the present invention will now be described in detail with reference to the accompanying drawings, in a case where it is applied to a Stirling cycle engine as an example. In FIGS. 1 and 2, reference number 1 denotes a casing which comprises a cylindrical portion 2 having substantially cylindrical shape; and a main body portion 3 having also substantially cylindrical shape. The cylindrical portion 2 is made from, for example, a stainless steel and comprises a proximal portion 4, an intermediate portion 5 and a distal portion 6 which are integrated with one another.

Inside the cylindrical portion 2, a cylinder 7 extending to the inside of the main body portion 3 is coaxially inserted. An extended cylinder portion 7A which is a discrete portion from the cylinder 7 is coaxially connected to the distal end of the cylinder 7 adjacent to the distal portion 6. The cylinder 7 locating adjacent to the main body portion 3 is integrally formed with mounts 26, 27 (described later) and a plurality of connecting arms 30 (also described later) by casting such as die casting while using aluminum, and the inner and the outer peripheries thereof are formed by cutting after casting. A displacer 8 is provided inside the distal part of the cylinder 7 and that of the extended cylinder portion 7A so as to be sidable along the axial direction thereof. An expansion chamber E is provided between the distal end of the displacer 8 and the distal portion 6 of the cylindrical portion 2. The inside and the outside of the extended cylinder portion 7A are communicated via an aperture 9. In the intermediate portion 5, a regenerator 10 is provided between the inner periphery of the cylindrical portion 2 and the outer periphery of the cylinder 7. In the proximal portion 4, a communication hole 11 for allowing the inside of the cylinder 7 to communicate with the outside thereof is formed on the cylinder 7. A heat absorbing fin 12 is provided between the inner periphery of the distal portion 6 included in the cylindrical portion 2 and the outer periphery of the distal end of the extended cylinder portion 7A, while a heat dissipating fin 13 is provided around the outer periphery of the cylinder 7 in between the regenerator 10 and the communication hole 11. A path 14 is formed so as to connect the distal end of the inside of the extended cylinder portion 7A to the compression chamber C provided inside the cylinder 7 through the aperture 9, the heat absorbing fin 12, the regenerator 10, the heat dissipating fin 13 and the communication hole 11. A piston 15 is provided inside the proximal side of the cylinder 7 in a manner capable of sliding in the axial direction of the cylinder 7. The proximal portion of the piston 15 is coaxially connected to a driving mechanism 16. The driving mechanism 16 which is connected to the proximal portion of the piston 15 by a connecting member 15A comprises: a short-cylindrical supporting member 17 having an extensional form and coaxially provided on the outer periphery of the proximal side of the cylinder 7; a cylindrical permanent magnet 18 having a short-cylindrical shape and being fixed to the inner peripheral surface of the distal portion of the supporting member 17; an annular electromagnetic coil 19 provided adjacent to the outer peripheries of the permanent magnets 18; and a magnetism introducing portion 20 provided adjacent to the inner periphery of the permanent magnet 18.

The supporting member 17 comprises, for example, a synthetic resin, while the permanent magnet 18 which is fixed to the inner surface of the distal portion of the supporting member 17 comprises a Nd—Fe—B sintered magnetic material. When the supporting member 17 is molded, the permanent magnet 18 yet un-magnetized at this stage is pre-set in a die (not shown) for molding the supporting member 17. In this state, a material of the supporting member 17 is then filled into the die. Accordingly, the permanent magnet 18 is integrally insert-molded within the inner periphery of the distal portion of the supporting member 17. After molding, the permanent magnet 18 is magnetized along its radial direction.

To a connecting member 15A which connects the piston 15 to the supporting member 17, a first flat spring 21 for controlling the operation of the piston 15 is attached. To the proximal side of the displacer 8, one end of a rod 22 is connected for controlling the operation of the displacer 8, while the other end thereof is connected to a second flat spring 23. The rod 22 extends in a manner that it penetrates the piston 15. As illustrated, a pair of the flat springs 21, 23 is placed outside the proximal part of the cylinder 7 in the main body portion 3. The second flat spring 23 is placed in a position away from the proximal part of the cylinder 7 compared to a position where the first flat spring 21 is placed. The electromagnetic coil 19 is wound around an electromagnetic core 24, while the electromagnetic core 24 is integrated with the electromagnetic coil 19.

On the outer peripheral surface of the intermediate part of the cylinder 7, a mount 26 coaxially protruding along with the cylinder 7 is integrally formed, while on a position more closer to the proximal end of the cylinder 7 than the position where the mount 26 is placed, a flange-type mount 27 is integrally formed with the cylinder 7. These mounts 26, 27 are placed so as to have a predetermined interval. The mount 26 contacts the proximal portion 4 of the cylindrical portion 2 via a plurality of O-rings 26A and fixes the cylinder 7 to the cylindrical portion 2 of the casing 1. The mount 27 employs a structure such that one side surface 27A thereof contacts a mount portion 3A locating in the inside of the main body portion 3. The mount 27 is fixed to the mount portion 3A by at least one screw, while the other side surface 27B thereof contacts one end of the electromagnetic core 24 comprising the driving mechanism 16. The other end of the electromagnetic core 24 contacts a fixation ring 28. For supporting the electromagnetic core 24, the mount 27 and the fixation ring 28 sandwiches it while a screw 29 fastens these. Accordingly, the electromagnetic core 24 and the electromagnetic coil 19 which is integrated with it are mounted onto the mount 27. Moreover, on the other side surface 27B of the mount 27, pluralities of connecting arms 30 are provided so as to protrude from the other side surface 27B along the axial direction of the cylinder 7. As illustrated, the connecting arms 30 are integrally formed with the mount 27 via proximal portions 30A thereof. The first flat spring 21 is attached to the distal portions of the connecting arms 30 via spacers 31, while the second flat spring 23 is attached to the spacers 31 by screws 32.

The Stirling cycle engine further has a vibration absorbing unit 33 as shown in FIG. 2. The vibration absorbing unit 33 comprises a plurality of blade springs 34 and a balance weight 35. Both the blade springs 34 and the balance weight 35 are coaxially arranged relative to the cylinder 7 such that the blade springs 34 stack on the balance weight 35 through a connecting portion arranged on the axial line of the cylinder 7.

The cylinder 7 is thus fixed with the mount 26 contacting the inside of the proximal portion 4 included in the cylindrical portion 2 via the O-ring 26A, while the one side surface 27A of the mount 27 contacting the mount portion 3A in the main body portion 3, thereby being fixed to the casing 1. Since the mount 26 contacts the inner surface of the cylindrical portion 2 via the O-ring 26A, the cylinder 7 can be coaxially arranged relative to the cylindrical portion 2. The cylinder 7 attaches the magnetism introducing portion 20 to the outer periphery of the proximal end thereof, fixes the electromagnetic coil 19 and the electromagnetic core 24 both included in the driving mechanism 16 to the mount 27 integrally formed with the cylinder 7 by the fixation ring 28 and the screw 29. The displacer 8 and the piston 15 are installed in the cylinder 7. The first flat spring 21 attached to the connecting member 15A adjacent to the proximal portion of the piston 15 is sandwiched and supported between the connecting arms 30 and the spacers 31. The outer periphery of the second flat spring 23 that the center part thereof is connected to the other end of the rod 22 connected to the displacer 8 is fixed to the other ends of the spacers 31. The main body portion 3 and the cylindrical portion 2 are connected each other, and the vibration absorbing unit 33 pre-assembled is then attached to the main body portion 3.

Next, operations of the Stirling cycle engine with the fixation framework for a ring-shaped permanent magnet of this embodiment will now be described. When an alternate current is applied to the electromagnetic coil 19, an alternate magnetic field is generated from the electromagnetic coil 19 and concentrated around the electromagnetic core 24. A force for allowing the permanent magnet 18 to reciprocate along the axial direction of the cylinder 7 is then generated by the generated alternate magnetic field. Due to this, the piston 15 connected to the supporting member 17 for supporting the permanent magnet 18 starts reciprocating in the cylinder 7 along its axial direction. When the piston 15 moves in the direction for coming close to the displacer 8, a gas within the compression chamber C locating in between the displacer 8 and the piston 15 is compressed. The compressed gas then flows into the expansion chamber E locating in between the distal end of the displacer 8 and the distal portion 6 of the cylindrical portion 2, through the communication hole 11, the heat dissipating fin 13, the regenerator 10, the heat absorbing fin 12 and the aperture 9. Accordingly, the displacer 8 is pressed downwardly with a predetermined phase difference relative to the piston 15. On the other hand, when the piston 15 moves in the direction for coming away from the displacer 8, the inside of the compression chamber C is subject to negative pressure and the gas in the expansion chamber E flows back to the compression chamber C through the aperture 9, the heat absorbing fin 12, the regenerator 10, the heat dissipating fin 13 and the communication hole 11. Accordingly, the displacer 8 is pressed upwardly with the predetermined phase difference relative to the piston 15. Throughout these processes, a reversible cycle consisting of two changes: an isothermal change; and an isovolumetric change is carried out, thus the adjacent part of the expansion chamber E is brought into a low-temperature state, while the compression chamber C is brought into a high-temperature state.

The driving mechanism 16 used in the Stirling cycle engine generates a force for allowing the permanent magnet 18 to reciprocate along the axial direction by the alternate magnetic field generated from the electromagnetic coil 19. Because the piston 15 connected to the supporting member 17 holding the permanent magnet 18 is reciprocated in the cylinder 7 in the axial direction, it is thus important to coaxially assemble the supporting member 17 and the permanent magnet 18 relative to the piston 15. In this embodiment, because the permanent magnet 18 is integrally insert-molded with the supporting member 17, processes necessary for fixing such as an insertion of the permanent magnet 18, an adhesion or the like are not necessary, while a coaxial alignment accuracy of the permanent magnet 18 relative to the supporting member 17 depends only on a precision of a die for insert-molding. Therefore, the coaxial alignment accuracy of the permanent magnet 18 relative to the supporting member 17 improves.

Moreover, the permanent magnet 18 having a ring-shape and being fixed to the inner periphery of the supporting member 17 is formed from a Nd—Fe—B sintered magnetic material. The permanent magnet 18 made from a Nd—Fe—B sintered magnetic material has characteristics such that it has a positive thermal expansion coefficient along a direction parallel with a magnetic flux (in other words, a direction for magnetizing) and a negative thermal expansion coefficient along a direction perpendicular to the magnetic flux. In this connection, when the ring-shaped permanent magnet 18 is magnetized along its radial direction, it has a positive thermal expansion coefficient along a direction of its thickness which is parallel with the direction of the magnetic flux, and a negative thermal expansion coefficient along a direction of its surface which is perpendicular to the direction of the magnetic flux. Consequently, when the ring-shaped permanent magnet 18 is cooled down, it contracts along the direction of its thickness and expands along the direction of its surface. As a result, the permanent magnet 18 entirely expands toward its radial and axial directions. On the other hand, the resin constructing the supporting member 17 has a positive thermal expansion coefficient. Thus it contracts when cooled down. Therefore, in the fixation framework for a ring shaped permanent magnet 18 according to this embodiment, the supporting member 17 contracts inwardly along a direction of an arrow A shown in FIG. 1, while the permanent magnet 18 expands outwardly along a direction of an arrow B after molding. Accordingly, the permanent magnet 18 is firmly fixed to the supporting member 17, and a clearance is not created between the bonded surface of the supporting member 17 and that of the permanent magnet 18. Thus coaxial alignment accuracies of the supporting member 17 and the permanent magnet 18 can be kept to a right degree. This makes it possible to coaxially place the piston 15 relative to the permanent magnet 18 accurately. By improving the entire coaxial alignment accuracy relative to the piston 15 of the supporting member 17 and the permanent magnet 18, the performance of the driving mechanism 16 can be improved. As a result, the performance of the Stirling cycle engine is improved. Moreover, according to this embodiment, processes or members for fixing such as bonding the permanent magnet M are not required, thus an assembling workability can be improved. Further, according to this embodiment, an adhesive is not used, this will results in a fact that the fixation framework of this embodiment is not substantially affected by an environment of its application, for example, an ambient temperature. Due to this, the fixation framework is not easily varied across the ages.

The present invention is not limited to the above embodiment. For example, whilst the case that the fixation framework for a ring-shaped permanent magnet is used in the driving mechanism of the Stirling cycle engine is taken as an example in the above embodiment, it may be used in a driving mechanism included in the other kind of equipment. It may be also used in various type of motor.

Various embodiments and changes may be made thereonto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention within the claims are to be regarded to be in the scope of the present invention.

What is claimed is:

1. A fixation framework for ring-shaped permanent magnet comprising a movable ring-shaped permanent magnet and a movable supporting member for supporting said ring-shaped permanent magnet, wherein:

said supporting member comprises a synthetic resin;

said permanent magnet is integrated with said supporting member by insert-molding, said supporting member and said permanent magnet have a spatial relationship in radial direction thereof such that said ring-shaped permanent magnet locates inside, and said supporting member locates outside, and said permanent magnet has a positive thermal expansion coefficient along a direction of thickness thereof, the direction of thickness thereof being parallel to the direction of magnetizing, and a negative thermal expansion coefficient along a direction of surface thereof, the direction of surface thereof being perpendicular to the direction of magnetizing.

2. The fixation framework for ring-shaped permanent magnet according to claim 1 wherein said permanent magnet comprises a Nd—Fe—B magnetic material, and magnetized in radial direction thereof such that inside and outside thereof have different polarities.

* * * * *